United States Patent
Solomond et al.

[11] Patent Number: 6,155,543
[45] Date of Patent: Dec. 5, 2000

[54] SPRING SEAT ASSEMBLY FOR AN AUTOMOTIVE VEHICLE

[75] Inventors: Jonathan P. Solomond, Farmington Hills; James J. Johnson, Metamora; Michael S. Weaver, Clarkston; Richard J. Turonek, Jr., Metamora, all of Mich.

[73] Assignee: DaimlerChrysler Corporation, Auburn Hills, Mich.

[21] Appl. No.: 09/239,029

[22] Filed: Jan. 27, 1999

[51] Int. Cl.$^7$ ................................................. B60G 13/00
[52] U.S. Cl. ............................................ 267/216; 280/668
[58] Field of Search .................... 267/195, 204, 267/216; 280/124.146, 124.147, 124.145, 124.151, 124.154, 124.155

[56] References Cited

U.S. PATENT DOCUMENTS

| | | | |
|---|---|---|---|
| Re. 31,184 | 3/1983 | Lederman | 280/668 |
| 4,084,837 | 4/1978 | Milner | 280/668 |
| 4,175,771 | 11/1979 | Muzechuk et al. | 280/696 |
| 4,274,655 | 6/1981 | Lederman | 280/688 |
| 4,434,977 | 3/1984 | Chiba et al. | 267/33 |
| 4,465,296 | 8/1984 | Shiratori et al. | 280/668 |
| 4,699,530 | 10/1987 | Satoh et al. | 384/609 |
| 4,721,325 | 1/1988 | Mackovjak et al. | 280/668 |
| 4,756,517 | 7/1988 | Kakimoto | 267/220 |
| 4,810,003 | 3/1989 | Pinch et al. | 280/668 |
| 4,958,849 | 9/1990 | Pinch et al. | 280/668 |
| 4,971,296 | 11/1990 | Kondo | 267/220 |
| 5,005,855 | 4/1991 | Lee | 280/662 |
| 5,048,859 | 9/1991 | Nishikuma | 280/668 |
| 5,454,585 | 10/1995 | Dronen et al. | 280/660 |
| 5,467,970 | 11/1995 | Ratu et al. | 267/220 |
| 5,467,971 | 11/1995 | Hurtubise et al. | 267/220 |
| 5,470,049 | 11/1995 | Wohler et al. | 267/172 |
| 5,664,650 | 9/1997 | Kammel et al. | 188/321.11 |
| 5,823,552 | 10/1998 | Etnyre | 280/124.179 |

FOREIGN PATENT DOCUMENTS

| | | |
|---|---|---|
| 407 360 | 5/1989 | European Pat. Off. . |
| 2431675 | 1/1976 | Germany . |
| 61-24608 | 2/1986 | Japan . |

*Primary Examiner*—Matthew C. Graham
*Assistant Examiner*—C. T. Bartz
*Attorney, Agent, or Firm*—Lawrence J. Shurupoff

[57] ABSTRACT

A spring and strut mount assembly for an automotive vehicle includes a strut provided with a shock absorber having a piston reciprocable in a cylinder and a piston rod extending axially outwardly from one end of the cylinder. A strut mount is adapted to be secured to a rigid frame of the vehicle. The outer end of the piston rod is secured to the strut mount. A spring unit resists retraction of the piston rod. The spring unit has upper and lower spring seats. The upper spring seat is mounted to the strut mount. The upper spring seat assembly is parallel and diverging to the strut mount and tower, perpendicular to the coil spring center line, perpendicular to the strut center line and parallel to the upper plane of the coil spring's end, all at the same time. The lower spring seat is mounted on the cylinder. A coil spring encircles the shock absorber and is held between the seats. The central axis of the spring extends at an acute angle to the central axis of the strut.

2 Claims, 4 Drawing Sheets

SPRING SEAT ASSEMBLY FOR AN AUTOMOTIVE VEHICLE

This invention relates to a upper spring seat assembly for automotive vehicles.

BACKGROUND AND SUMMARY OF THE INVENTION

The front end of a modern motor vehicle body is typically supported by two spring and strut assemblies, each including a strut, strut mount, bearing, spring seat and a spring. To achieve a comfortable ride, a satisfactory spring rate must be maintained. However, the hoods of late model motor vehicles are much lower than heretofore. The designers demand this. As the hood becomes lower and lower, the spring and strut assembly must be shortened, making it difficult to maintain a satisfactory spring rate.

In accordance with the present invention, the central axis of the spring is disposed at an acute angle to the central axis of the strut. This is done to balance the forces acting on and in the spring and strut assembly.

Further in accordance with the invention, the strut includes a shock absorber having a piston reciprocable in a cylinder. The spring is a coil spring which encircles the shock absorber. However, the spring seats are set at an angle to the shock absorber and support the spring in a manner such that the central axis of the spring extends at an acute angle to the central axis of the shock absorber. Even though the shock absorber may be shortened by the demands of automotive design, the overall travel of the shock and similarly the spring require that the length of the spring, and hence the spring rate, may be maintained.

Preferably the upper spring seat has a central hub which is aligned axially with the central axis of the shock absorber. A bearing supporting the hub may thus be aligned with the shock absorber even though the upper spring seat is angularly off-set to support the spring.

One object of this invention is to provide a spring and strut mount assembly having the foregoing features and capabilities.

Another object is to provide a spring and strut mount assembly which is rugged and durable in use, and is capable of being inexpensively manufactured and assembled. Typically, it is desirable that these components be light in weight.

Another object is to provide sufficient noise, vibration, and harshness isolation to the coil spring. This is typically done with a relatively thick and soft rubber isolator pad.

These and other objects, features and advantages of the invention will become more apparent as the following description proceeds, especially when considered with the accompanying drawings.

DETAILED DESCRIPTION OF THE PREFERRED EMBODIMENT

Figure 1:
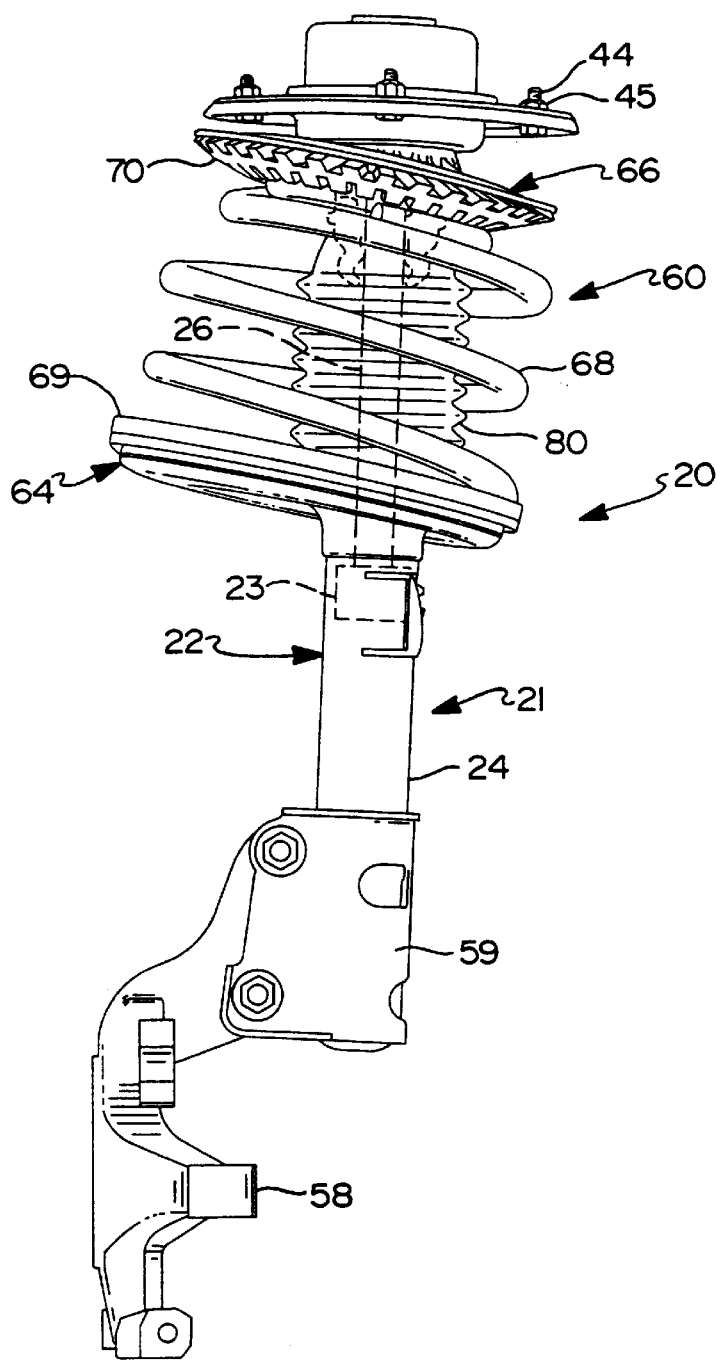
FIG. 1 is a side elevational view of a spring and strut mount assembly constructed in accordance with the present invention.

Referring now more particularly to the drawings, there is shown a spring and strut assembly 20 including an elongated extensible and contractible strut 21 in the form of a shock absorber 22 having a piston 23 reciprocable in an elongated cylinder 24. The piston has a rod 26 which extends through an opening in the upper end of the cylinder. The rod 26 has a reduced end portion forming a threaded stud 29 which extends through a hole in a center plate 30 of a strut mount 32 and is secured to the center plate by a nut 34 threaded on the rod's stud 29. The center plate 30 is secured to an outer ring plate 38 of the strut mount 32 by a resilient ring 40. The resilient ring 40 also secures the center plate 30 to an annular cover plate 42 of the strut mount. The outer ring plate 38 and cover plate 42 of the strut mount are adapted to be secured to a rigid fixed frame member 43, typically the flat mounting surface of a shock tower of the motor vehicle, by bolts 44 and nuts 45.

An elongated tubular jounce bumper 54 of a resilient, flexible, compressible material such as an elastomer is sleeved on the rod 26 between the center plate 30 of the strut mount 32 and the upper end of the cylinder 24. The jounce bumper is engaged by the upper end of the cylinder 24 when the piston 23 of the shock absorber 22 strokes and the rod 26 moves into the cylinder 24, to axially compress the jounce bumper 54 and impart a cushioning action.

A brake and knuckle module 58 is secured to the lower end of the cylinder 24 of the shock absorber 22 by a bracket 59.

Figure 6:
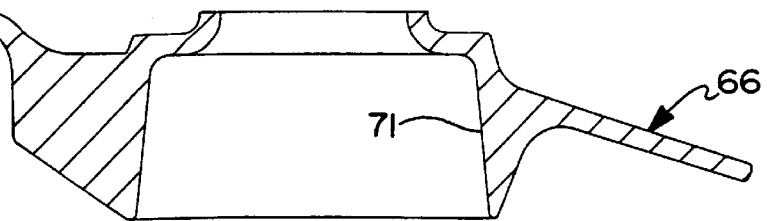
FIG. 6 is a sectional view taken on the line 6—6 in FIG. 4.
Figure 2:
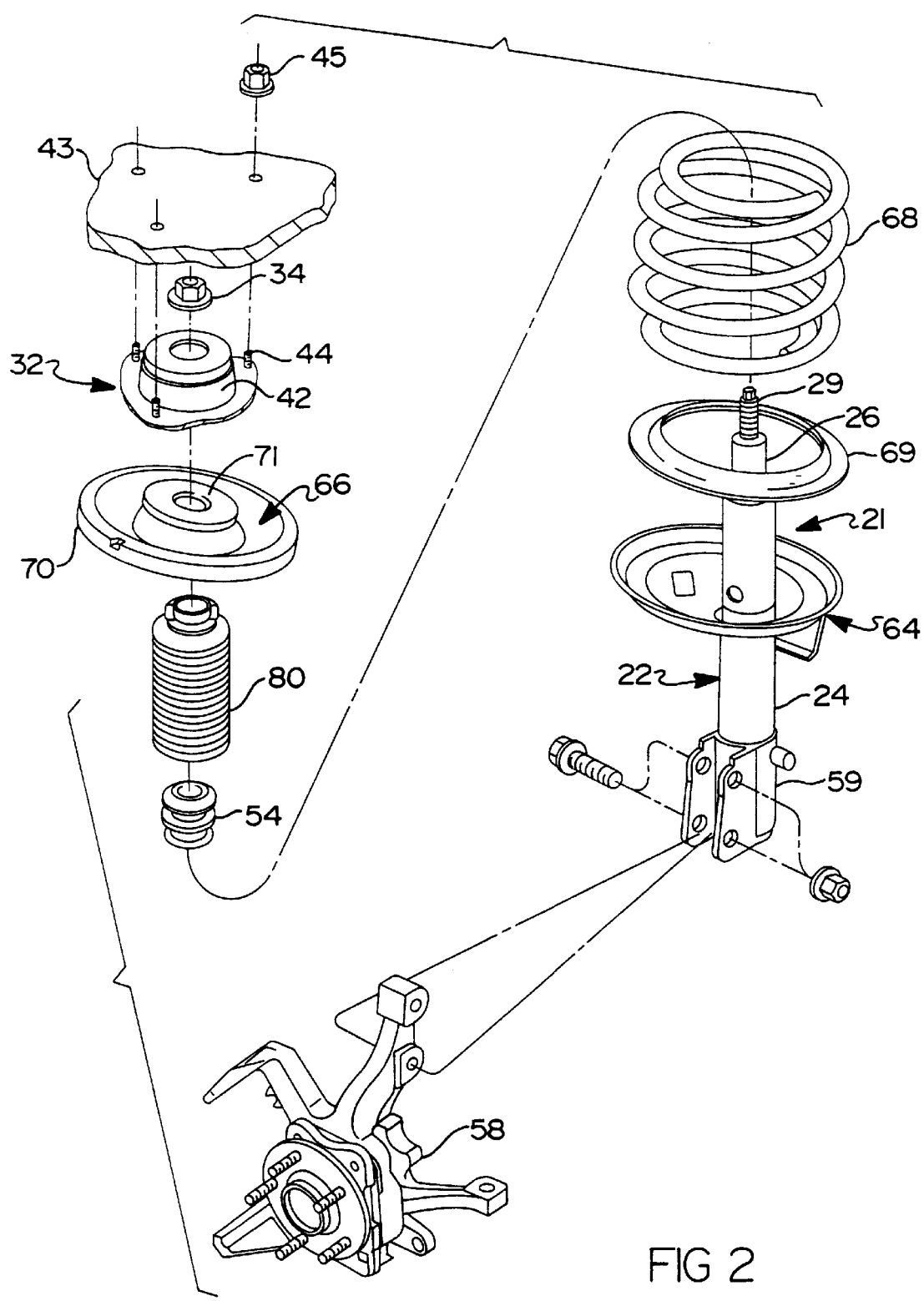
FIG. 2 is an exploded perspective view of the assembly shown in FIG. 1.
Figure 4:
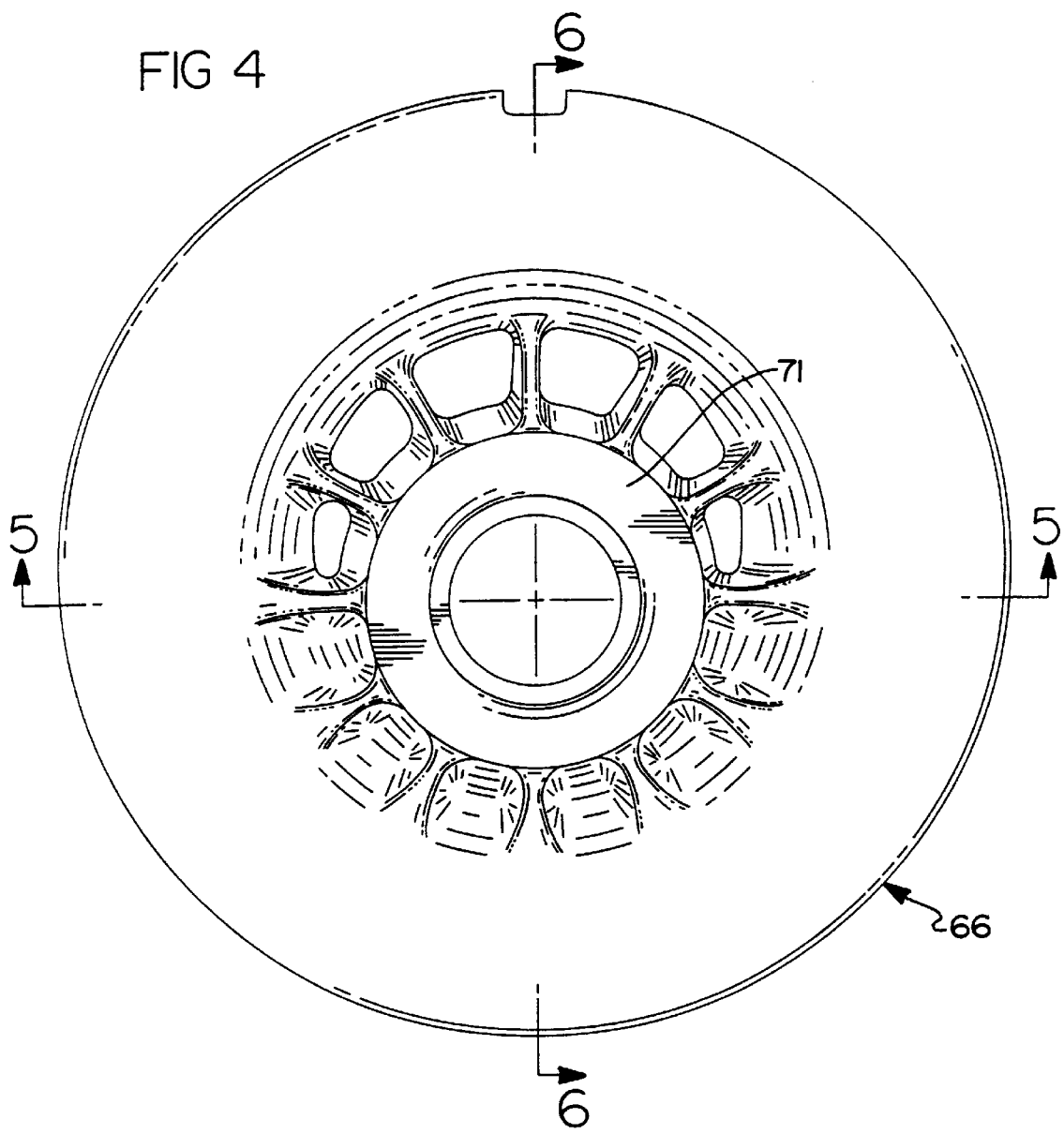
FIG. 4 is a top plan view of the upper spring seat.
Figure 5:
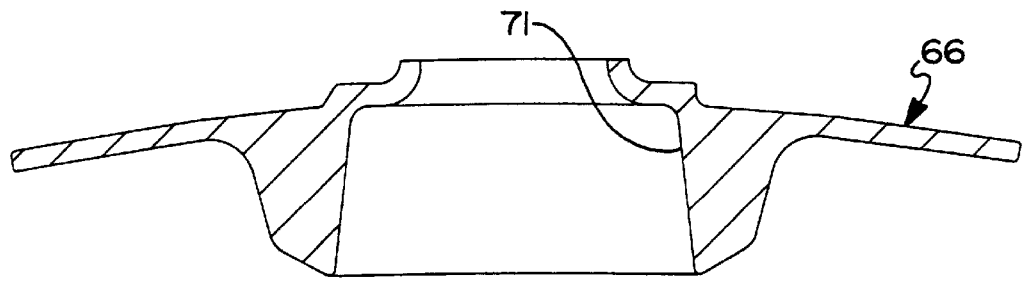
FIG. 5 is a sectional view taken on the line 5—5 in FIG. 4.

The spring and strut assembly 20 includes a spring unit 60 for resisting contraction of the piston rod 26 into the cylinder 24. The spring unit includes an annular lower spring seat 64 which is secured to the cylinder 24 intermediate its ends as by welding and/or a wedging effect, and an annular upper spring seat 66. The upper spring seat 66 is best shown in FIGS. 4–6. A coil spring 68 encircles the shock absorber, with its lower end seated on an optional isolator 69 carried by the lower spring seat 64 and its upper end seated on an upper isolator 70 carried by the upper spring seat 66. As seen in FIG. 5, the underside 65 of the upper spring seat 66 defines an arcuate surface 67 which lies at least in part along a cupped surface.

Figure 3:
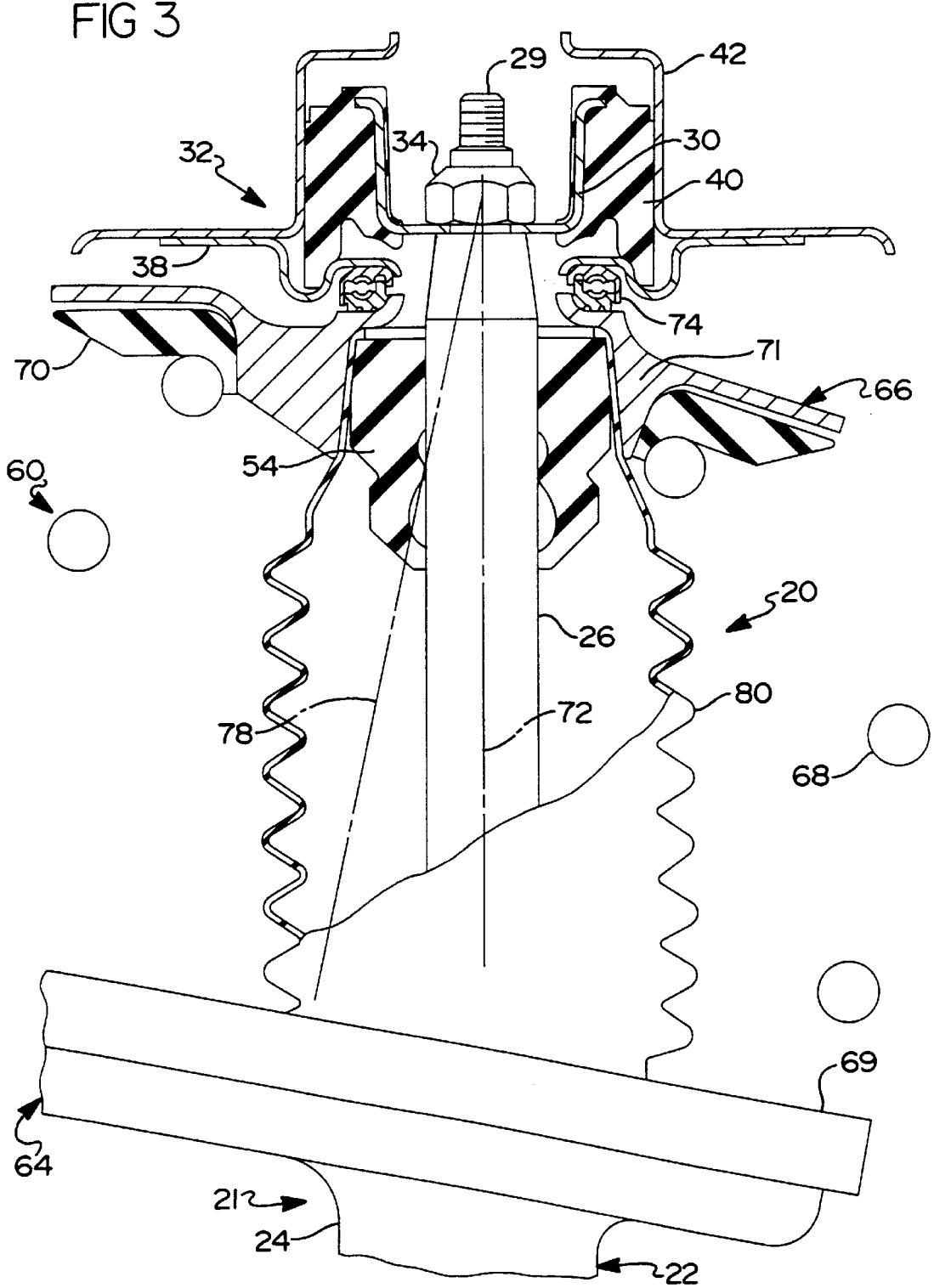
FIG. 3 is an enlarged elevational view with parts in section of a portion of the assembly shown in FIG. 1.

The upper spring seat 66 has an integral central hub 71 which is axially aligned with the longitudinal central axis or centerline 72 of the strut 21, which is also the longitudinal central axis or centerline of the cylinder 24 and piston rod 26 of the shock absorber (FIG. 3). An annular ball bearing unit 74 rotatably supports the outer ring plate 38 of the strut mount 32 on the hub. A tubular dust shield 80 surrounds the piston rod 26 of the shock absorber 22 and is secured to the jounce bumper 54. The compression interface of the jounce bumper 54 on the rod 72 maintains the proper positioning of the dust shield 80.

It will be noted that while the hub 71 of the upper spring seat 66 is axially aligned with the centerline 72 of the strut, the front view of the lower surface of spring seat 67 itself actually is disposed at an acute angle to the strut (FIG. 6). The lower spring seat 64 is disposed at a similar acute angle to the strut and hence is parallel to the upper spring seat 66.

The coil spring 68 consists of a continuous spring element which extends helically around the strut. The spring is perpendicular to the seats, and because of the angular orientation of the spring seats, the central axis or centerline 78 of the spring 68 flares outwardly from the upper spring seat 66 to the lower spring seat 64 at an acute angle to the centerline 72 of the strut 21 (FIG. 3).

By making the outboard surface portion 85 of the spring seat 66 parallel to the outer ring plate 38, the spring seat and ring plate can be placed closer to each other than traditionally possible. The cupped or curved shape of the spring seat 66 along with the correspondingly contoured isolator 70 which is perpendicular to the spring centerline 78 allows the coil spring 68 to be longer while maintaining proper positioning and isolation.

Certain geometric relationships are defined between the spring isolator, shock tower, spring seat, hub and strut which provide the advantages noted above. In particular, the frustoconical recess 75 formed in the hub 71 of the upper spring seat 66 is disposed coaxially around the centerline 72 of the strut 21. In addition, the bottom of the surface portion 77 of the isolator 70 which receives and seats the coil spring 68 is aligned in a plane which is perpendicular to the axis 78 of spring 68. Plane 73 is aligned at an angle to centerline 72 so that the upper coil of the spring 68 is seated eccentrically around and at an angle to the centerline 72 of strut 21.

Another important relationship is that the outer diameter of the spring seat defines a circular peripheral edge 81 which is centered around the axis 78 of spring 68. This edge 81 diverges away from the outer ring plate 38 from the outboard side of the spring seat 66 to the side 87 of the spring seat.

What is claimed is:

1. A spring and strut assembly for an automotive vehicle comprising, an elongated strut having a longitudinally extending central axis, said strut comprising a shock absorber including an elongated cylinder extending along the central axis of said strut, a piston axially reciprocable in said cylinder and having a piston rod extending axially outwardly from an end of said cylinder, a strut mount adapted to be secured to a rigid frame of the vehicle, means securing an outer end of said piston rod to said strut mount, a spring unit resisting contraction of the piston rod inwardly of the cylinder, said spring unit comprising parallel first and second spring seats, means mounting said first spring seat on said strut mount, means mounting said second spring seat on said cylinder in spaced relation to said first spring seat, and an elongated spring having ends seated on said respective spring seats, said spring having a longitudinally extending central axis disposed at an acute angle to the central axis of said strut, said spring seats having spring-supporting radially outer portions which are slanted relative to the central axis of the strut and perpendicular to the central axis of the spring, said first spring seat having an integral central hub, said hub being axially aligned with the central axis of said strut, and said means mounting said first spring seat on said strut mount comprising a bearing, said bearing being axially aligned with the central axis of said strut and engaging parallel surfaces of said hub and said strut mount which are perpendicular to the central axis of the strut.

2. A spring and strut mount assembly according to claim 1, wherein the central axis of said spring flares away from the central axis of the strut in a direction from said first spring seat to said second spring seat, and said spring is a coil spring having a continuous, helical spring element encircling said strut.

* * * * *